United States Patent Office 3,350,876
Patented Nov. 7, 1967

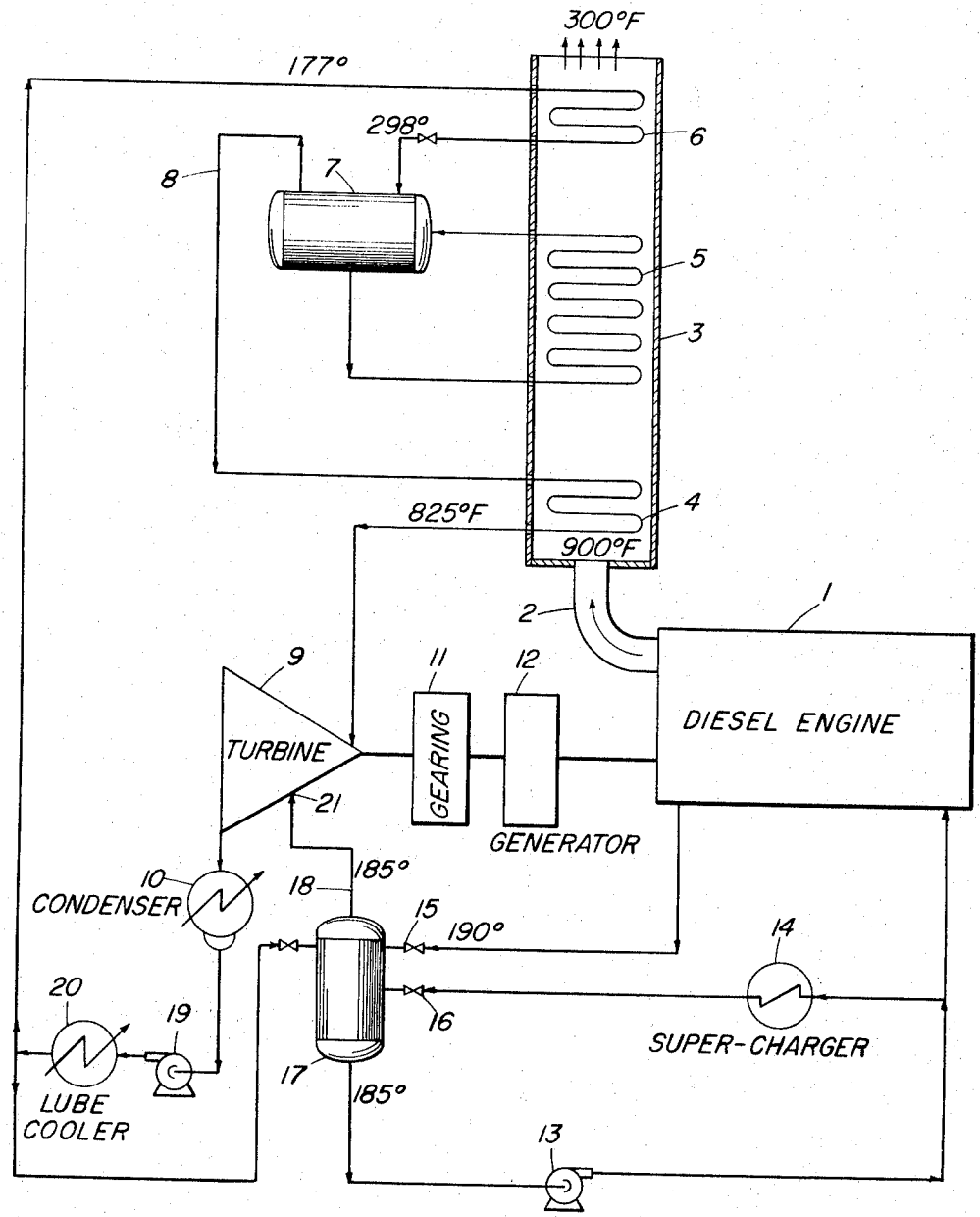

3,350,876
INTERNAL COMBUSTION ENGINE PLANT
Roy W. P. Johnson, 382 Riversville Road,
Greenwich, Conn. 06830
Filed Jan. 19, 1966, Ser. No. 521,585
6 Claims. (Cl. 60—11)

This invention relates to a combination of a liquid cooled internal combustion engine with a steam generator and turbine which improves the efficiency of transformation of heat energy of fuel into mechanical or electrical energy.

Internal combustion engines, and particularly diesel engines, are extensively used for large power plants, for example in motor ships, electrical central plants, standby power and the like. While the present invention is not limited to any particular size of internal combustion engine, its economic field of operation is primarily in large units, such as for example diesel engines developing 1,000 horsepower or more, and the further description will be in connection with a typical diesel engine plant. The invention is not in the slightest affected, however, by the particular cycle of the internal combustion engine, whether Otto, diesel, or other cycles, and the invention is equally applicable to any such engine, the choice being merely a matter of economics. Most large internal combustion engine intallations involve large diesel engines although large engines operating on blast furnace gas, which are often Otto cycle engines, represent a non-diesel field which is of sufficient size so that the economic value of the present invention becomes of large practical interest.

Diesel engines, for example four-cycle diesel engines, are extremely efficient power producers, the best of them being capable of putting out approximately 40% of the heat energy of the fuel in the form of mechanical work. However, the remaining 60% of the fuel value normally represents an unavoidable loss. About one-third is lost in the heat of the exhaust and another respectable loss is in cooling water for the engine itself, cooling of lubricating oil, and, if it is supercharged, for supercharger cooling. In very large engines, such as for example engines operating on blast furnace gas, the valves may be so large that they also are water cooled, and this represents a further loss of heat.

The present invention recovers as useful mechanical work as much as two-thirds or more of the heat of the exhaust and a large proportion of the heat wasted in the cooling fluids used for the engine and its accessories. It is possible in a large installation to increase the utilization of fuel heat in producing mechanical power by approximately 20%. In other words, instead of transforming 40% of the energy in the fuel into mechanical work, a transformation of about 48% is possible, which represents a very marked saving in fuel. In the case of less efficient internal combustion engines, such as gasoline engines operating on the Otto cycle, rotary piston engines such as Wankel engines, and the like, which have lower efficiencies in fuel utilization, the percentage of improved fuel utilization made possible by the present invention is even greater. However, because most of these engines are either used in relatively small sizes as compared to huge diesel plants or require a maximum of lightness, as in the case of large aircraft engines, this makes the present invention economically less attractive even though the percentage improvement in fuel utilization is actually higher.

It has been proposed in the past to generate steam from the exhaust gases of internal combustion engines, and where there is a demand for a low pressure saturated process steam, a portion of the heat units in the cooling fluids for the engine have also been used. In a particular typical case this low pressure exhaust steam has been utilized for water distillation to produce pure feed water for other steam boilers or the steam has been utilized directly for heating purposes. While it is possible to utilize steam from exhaust gas steam generators for power production, this recovers only a portion of the lost fuel heat, and hitherto there has been no practical way of recovering a substantial amount of the heat wasted in cooling fluids. The combination of the present invention permits recovery of a considerable portion of such heat energy.

Essentially the present invention produces steam in two ways. The cooling fluid, usually water, of the engine and its accessories is dropped to sub-atmospheric pressure, for example of the order of 7 p.s.i.a. For example, if the cooling liquid at 190° to 200° F. is introduced into a flash generating chamber at 7 p.s.i.a., a portion of the water flashes into steam, cooling the remaining water down to about 185° F., the temperature of saturated 7 p.s.i.a. steam. This is then recirculated by the cooling pump and abstracts further heat from the engine and its accessories. This stream, however, is useless for practical power generation. Where it is possible to operate at higher temperatures, with water under pressure, the amount of steam which flashes is, of course, greater, but in very larger installations excessive cooling liquid temperature differentials are usually avoided to minimize stresses in the engine.

The exhaust gases, for example at about 900° F., are first passed over steam superheater coils, then through steam generating coils, and finally through economizer coils for heating up recirculated condensed steam. Steam is generated at a useful pressure, for example 50 pounds or more, and is superheated, for example to about 825° F. This steam is then introduced into a conventional steam turbine, and in its passage through the turbine it expands, does work, and its pressure and temperature are both reduced. When the pressure is reduced to the order of 7 p.s.i.a., the saturated steam flashed from the cooling water is introduced, and in mixing with the still superheated steam in the turbine is itself superheated, but to a temperature lower than the temperature of the expanded steam. The mixed steams then pass through the lower pressure portions of the turbine and may exhaust, for example, at about 1 p.s.i.a. as dry steam, thus maintaining turbine efficiency and preventing substantial condensation in the turbine, with possible resulting mechanical damage. The low pressure is, of course, obtained, as is conventional, by a suitable condenser, water being condensed at approximately 100° F., and this water is pumped through the economizer or feed water heater coils of the exhaust gas heated generator and is brought up again to the temperature of 50-pound saturated steam.

It is a great practical advantage of the present invention that the heat units in the cooling water are, to a considerable extent, recovered as useful steam which, though saturated, is superheated in the turbine and is effectively utilized for further power production. It is this practical recovery of a substantial portion of the heat in the cooling water and its transformation into mechanical energy that constitutes the important new result obtained by the present invention. Where there is a demand for low pressure saturated process steam, the present invention is not required as the saturated steam from the cooling water can be directly used wherever there is a heating operation which can utilize steam of this temperature. Where, however, there is not a large demand for process steam for heating purposes, the present invention permits important fuel saving in the greatly broadened field of power production.

In central station installations the fuel saving is the primary advantage of the present invention. The turbine generated power from the waste heat may, of course, be applied to the shaft of the diesel engine or for any other purpose; for example if the diesel plant is to be used for the generation of electric power, the additional power from the steam turbine may be used for excitation or other uses or a portion of the power may be so used. The invention is, of course, not concerned with what form the available mechanical power is utilized. In the case of shipboard operation there is an additional marked advantage. The saving of fuel represents not only saved dollars but also for a given bunker capacity the ship will have a longer operating radius or a smaller bunker capacity can be used which increases the available space for cargo. Often for motor ships these latter savings may be actually more important than the price of the fuel which is saved. In other transportation operations, such as large diesel locomotives, the smaller amount of fuel required for a given operating range is of importance, though not to quite so great a degree as in the case of ships.

It is an advantage of the present invention that it is extremely flexible and permits gain in power from a given amount of fuel. It is, of course, not necessary that 100% of the saved heat units be in the form of additional power. For example, there may be part of the saving used to generate more power or the same power with less fuel and a part used for other purposes, for example on shipboard for distilling sea water to supply the ship's need for fresh water. In such a case either a portion of the steam generated may be diverted to the other use or the power turbine may exhaust at a somewhat higher pressure, for example 3 or 4 p.s.i.a., and the condenser may be a part of a multiple-effect evaporating system to produce fresh water from sea water. These possible modifications are mentioned only as illustrations of the great flexibility which is provided by the present invention. In every case, of course, the designing engineer will utilize the advantages of the present invention to produce the maximum economic return.

The invention will be described in greater detail in connection with the drawing, which illustrates, diagrammatically, a typical large diesel engine plant.

The diesel engine 1 produces exhaust gas which passes through the duct 2 to the exhaust stack 3, which is shown in section in the drawing. Typically, the temperature of the exhaust gases entering the stack may be about 900° F. In the stack the gases first pass over steam superheater coils 4, then through the heating tubes 5 of the waste heat boiler, through the tubes of a boiler feed water heater 6, finally discharging into the atmosphere at about 300° F. or being otherwise used.

Boiler feed water enters the feed water heater coil 6 at about 177° F. and is heated to about 298° F., the temperature of saturated 65 p.s.i.a. steam. This water is introduced into the steam drum of the waste heat boiler, in which drum the steam is separated from the water as saturated steam passing from the drum 7 through pipe 8 to the steam superheater coils 4 in which it is superheated to about 825° F.

The superheated steam then goes to a turbine 9, which is shown purely diagrammatically, as the present invention does not change standard turbine design. In the turbine the steam expands to about 7.5 p.s.i.a. at an induction point 21, the expansion producing power in the turbine which is transmitted through speed reducing gearing 11 to the generator 12, which is also driven by a main shaft of the diesel engine.

Up to this point we have considered only the steam flow produced in the waste heat boiler. The cooling water of the diesel engine is supplied at 185° F. by the circulating pump 13 both to the jacket and to a turbo supercharger cooler 14. The water is heated in the jacket water system and cooler 14 to about 190°–200° F., and then is flashed in the flash drum 17 through the valves 15 and 16. This results in saturated 7.5 p.s.i.a. steam, at 185° F., in the drum in which the steam is separated from the water, the water being returned to the circulating pump 13. As the flash drum and separator is of conventional design, it is shown purely diagrammatically on the drawing.

The 7.5 p.s.i.a. saturated steam is conducted by pipe 18 to the induction point 21 of the turbine 9, where it mixes with the steam which is expanded through the turbine from the initial condition of 65 p.s.i.a. and 825° F. to 7.5 p.s.i.a. at 425° F. The mixture attains a temperature of approximately 315° F. and then expands further through the low pressure portion of the turbine to 1 p.s.i.a. and is condensed in the water cooled condenser 10, the condensate, at about 100° F., being withdrawn by the condensate return pump 19. This condensate is pumped through the engine lubricating oil cooler 20 in which it is heated to about 177° F. A portion of the heated condensate goes to the coils 6 of the boiler feed water heater and the remainder to the flash drum 17.

As the present invention is not concerned with the precise mechanical design of the waste heat boiler turbine, etc., which are of conventional construction, they have been shown in semi-diagrammatic form without showing the conventional accessories, such as means for boiler blow-down, make-up water, inert purging and deaeration.

It will be noted that the mixture of the low pressure steam from the flash drum 17 at the induction point 21 of the turbine 9 causes it to be superheated to 315° F., which is sufficiently high so that when finally exhausted at 1 p.s.i.a. from the low pressure exhaust of the turbine, the steam is still substantially dry, thus assuring high turbine efficiency.

The exact temperatures and pressures given above are merely illustrative of a typical example and can be varied within reasonable limits. It is an advantage of the present invention that these temperatures and pressures are not critical.

As described, the steam turbine drives the same shaft or generator as the diesel engine itself. This automatically prevents turbine runaway, because of course the diesel engine is contributing about five times as much power as is the turbine. This permits an ungoverned steam admission to the turbine, which is more economical and preferable, resulting not only in lowered first cost but some improvement in the efficiency of the turbine. Of course the present invention is not limited to the turbine power being applied to the same shafts or elements driven by the diesel engine and it may be applied to a separate generator or for driving other power consuming auxiliary machinery. In such a case it may be necessary to provide for governed steam introduction to the turbine, and of course the additional economies of ungoverned steam introduction are sacrificed. This is another illustration of the great flexibility of the present invention which enables utilization of its additional improvement in fuel utilization efficiency in various ways in accordance with the best requirements of a particular installation.

The invention has been described in connection with a water cooled internal combustion engine. This is by far the most common, and for most purposes the most desirable and economical type of installation. The invention is, however, not, in principle, limited to the particular fluid used for engine cooling so long as it is suitable for vapor generation and turbine use, and so in its broader aspects the invention is not limited to water as the cooling and auxiliary power generating medium.

Reference has been made above to the particular utility of the present invention in large installations. The theoretical efficiency of the invention is just as great in small installations and in fact somewhat greater if a less efficient internal combustion engine than a large diesel is used. However, auxiliary equipment, such as steam turbines, waste heat boilers, steam superheaters and the like, do not increase in cost linearly with increase in size. Therefore, for a very small unit the additional cost of these elements makes the present invention less attractive economically. It has nothing to do, however, with the effective operativeness of the combined cycles.

The term "internal combustion engine" has been used in its broader aspects, and is not necessarily limited to any particular design of piston engine or operating cycle. Theoretically, of course, it is applicable to other types of internal combustion engine, such as gas turbines. However, the ordinary gas turbine does not use liquid cooling, and since it is an essential feature of the present invention that the heat wasted in the liquid cooling be recovered in part as steam generated and combined with exhaust heat produced steam, the invention is ordinarily not applicable to conventional gas turbine designs. Where, however, liquid cooling is used for some special purposes, the present invention is applicable, and therefore the term internal combustion engine is used in its broadest sense.

The invention has been described in connection with a conventional internal combustion engine in which the cooling liquid is circulated through a cooling jacket as a liquid and there is no change in phase in the engine cooling system. In some large installations a vapor cooling system is used in which a portion of the cooling water boils and the steam produced is condensed in a suitable radiator and recirculated. The present invention can be used in such a system, which might be considered as one in which the vapor separator described in the drawings is a built in part of the engine cooling system itself. With such a system, the steam produced is not condensed in a radiator but is passed directly to the induction point 21 on the turbine. As the steam in a vapor cooling system is at a little higher temperature, and hence pressure, the point of introduction in the turbine is chosen so that the expanding steam from the waste heat boiler and superheater is at the same pressure and of course is at a higher temperature, so that after mixing the superheat of the mixed steam will provide for no substantial condensation during the low pressure expansion in the turbine. As the steam from the cooling system is at a somewhat higher temperature and pressure, an increased proportion of the heat otherwise wasted in the cooling system is recovered and so for this type of system the present invention represents an even greater saving in fuel utilization. Obviously, of course, a portion of the condensate from the turbine condenser is returned to the cooling system to make up for the water leaving it in the form of steam.

I claim:

1. An improved internal combustion engine plant cooled by liquid, comprising in combination,
    (a) a waste heat boiler, vapor superheater, and boiler feed liquid heater,
    (b) means for passing exhaust gases from the internal combustion engine counter-currently over the superheating, boiling, and liquid heating elements whereby vapor under pressure is produced and superheated,
    (c) means for transforming a portion of the engine cooling liquid into vapor,
    (d) a vapor turbine with a high pressure inlet connected to the exhaust generated and superheated vapor,
    (e) means for introducing at an intermediate point in the turbine the vapor produced, the point of introduction being chosen so that the vapor when admixed with the partially expanded superheated vapor in the turbine will result in a vapor superheat sufficient so that at normal, low pressure exhaust of the turbine, no substantial condensation of liquid takes place, and
    (f) means for condensing turbine exhaust vapor to liquid at a temperature to produce turbine exhaust pressures and means for recirculating a part of said condensate through the liquid feed heating elements of the exhaust gas heated vapor generator and then into the vapor generating portion thereof.

2. An improved internal combustion engine plant according to claim 1 in which the cooling liquid is water and the vapor generated is steam.

3. An improved internal combustion engine plant according to claim 2 in which the means for producing steam from a portion of the engine cooling water is a separate chamber in which the cooling water is introduced under pressure conditions such that a portion flashes into steam, the steam is separated and the remaining water recirculated through the cooling system.

4. An improved internal combustion engine plant according to claim 3 in which a portion of the condensate from the turbine exhaust condensing means is introduced into a part of the cooling system of the internal combustion engine.

5. An improved internal combustion engine plant according to claim 4 in which a portion of the condensate is passed in heat exchange relation to lubricating oil for the internal combustion engine.

6. An improved internal combustion engine plant according to claim 2 in which the internal combustion engine operates on the diesel cycle.

No references cited.

EDGAR W. GEOGHEGAN, *Primary Examiner.*